(12) United States Patent
Agarwal et al.

(10) Patent No.: US 10,311,093 B2
(45) Date of Patent: Jun. 4, 2019

(54) ENTITY RESOLUTION FROM DOCUMENTS

(71) Applicant: TATA Consultancy Services Limited, Mumbai, Maharashtra (IN)

(72) Inventors: Puneet Agarwal, Noida (IN); Gautam Shroff, Noida (IN); Pankaj Malhotra, Noida (IN)

(73) Assignee: Tata Consultancy Services Limited, Mumbai (IN)

( * ) Notice: Subject to any disclaimer, the term of this patent is extended or adjusted under 35 U.S.C. 154(b) by 202 days.

(21) Appl. No.: 14/533,866

(22) Filed: Nov. 5, 2014

(65) Prior Publication Data

US 2015/0205803 A1    Jul. 23, 2015

(30) Foreign Application Priority Data

Jan. 17, 2014   (IN) .......................... 169/MUM/2014

(51) Int. Cl.
*G06F 16/35* (2019.01)
*G06F 16/93* (2019.01)
*G06F 17/22* (2006.01)
*G06F 17/27* (2006.01)
*G06F 16/901* (2019.01)

(52) U.S. Cl.
CPC ........ *G06F 16/355* (2019.01); *G06F 16/9024* (2019.01); *G06F 16/93* (2019.01); *G06F 17/2211* (2013.01); *G06F 17/2229* (2013.01); *G06F 17/278* (2013.01)

(58) Field of Classification Search
CPC ................................................ G06F 17/3071
See application file for complete search history.

(56) References Cited

U.S. PATENT DOCUMENTS

| 8,683,312 | B2 * | 3/2014 | McAfee | G06F 17/2235 706/49 |
| 2004/0210763 | A1 * | 10/2004 | Jonas | G06F 17/30477 713/193 |
| 2009/0204590 | A1 * | 8/2009 | Yaskin | G06F 17/30011 |

(Continued)

OTHER PUBLICATIONS

Benjelloun et al., "Swoosh: a generic approach to entity reoslution", Mar. 11, 2008, Springer-Verlag, p. 255-276.*

(Continued)

*Primary Examiner* — Usmaan Saeed
*Assistant Examiner* — Katriel Y Chiu
(74) *Attorney, Agent, or Firm* — Banner & Witcoff, Ltd.

(57) ABSTRACT

The present subject matter relates to entity resolution, and in particular, relates to providing an entity resolution from documents. The method comprises obtaining the plurality of documents from at least one data source. The plurality of documents is blocked into at least one bucket based on textual similarity and inter-document references among the plurality of documents. Further, within each bucket, a merged document for each entity may be created based on an iterative match-merge technique. The iterative match-merge technique identifies, from the plurality of documents, at least one matching pair of documents and merges the at least one matching pair of documents to create the merged document for each entity. The merged documents may be merged to generate a resolved entity-document for each entity based on a graph clustering technique.

12 Claims, 4 Drawing Sheets

(56) References Cited

U.S. PATENT DOCUMENTS

| | | | | |
|---|---|---|---|---|
| 2010/0145902 A1* | 6/2010 | Boyan | ............... | G06F 17/3089 |
| | | | | 706/54 |
| 2011/0119268 A1* | 5/2011 | Rajaram | ........... | G06F 17/30887 |
| | | | | 707/737 |
| 2011/0173093 A1* | 7/2011 | Psota | .................... | G06Q 30/06 |
| | | | | 705/26.35 |
| 2013/0006975 A1* | 1/2013 | Li | ...................... | G06F 17/2795 |
| | | | | 707/723 |
| 2013/0311467 A1* | 11/2013 | Galle | ................ | G06F 17/2795 |
| | | | | 707/737 |
| 2014/0229473 A1* | 8/2014 | Mehrotra | ........... | G06F 17/3069 |
| | | | | 707/728 |
| 2014/0279299 A1* | 9/2014 | Erenrich | .......... | G06F 17/30312 |
| | | | | 705/30 |

OTHER PUBLICATIONS

Michael Welch, Aamod Sane, Chris Drome, Fast and Accurate Incremental Entity Resolution Relative to an Entity Knowledge Base, Oct. 2012, USA.

Steven Euijong Whang and Hector Garcia-Molina, Entity Resolution with Evolving Rules, Proceedings of the VLDB Endowment, 2010, vol. 3, No. 1.

* cited by examiner

ENTITY RESOLUTION FROM DOCUMENTS

TECHNICAL FIELD

The present subject matter relates, in general, to entity resolution and, particularly but not exclusively, to entity resolution from a plurality of documents.

BACKGROUND

Generally, when data from different sources is analyzed, often multiple records belong to the same real-world entity, such as same customer, same product and same organization. In order to find different records that belong to the same entity, a technique known as Entity resolution (ER) is widely used. In various disciplines, ER is also referred to as record linkage, de-duplication, co-reference resolution, reference reconciliation, object consolidation, identity uncertainty and database hardening. ER has a wide scope of application, for example, in government and public health data, web search, shopping and law enforcement. In practice, dynamics pertaining to the ER may keep changing, e.g., corresponding data set may keep changing over a period of time. Therefore, in order to accommodate such changes associated with the data, ER has to be performed regularly to update an ER result set of resolved entities.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
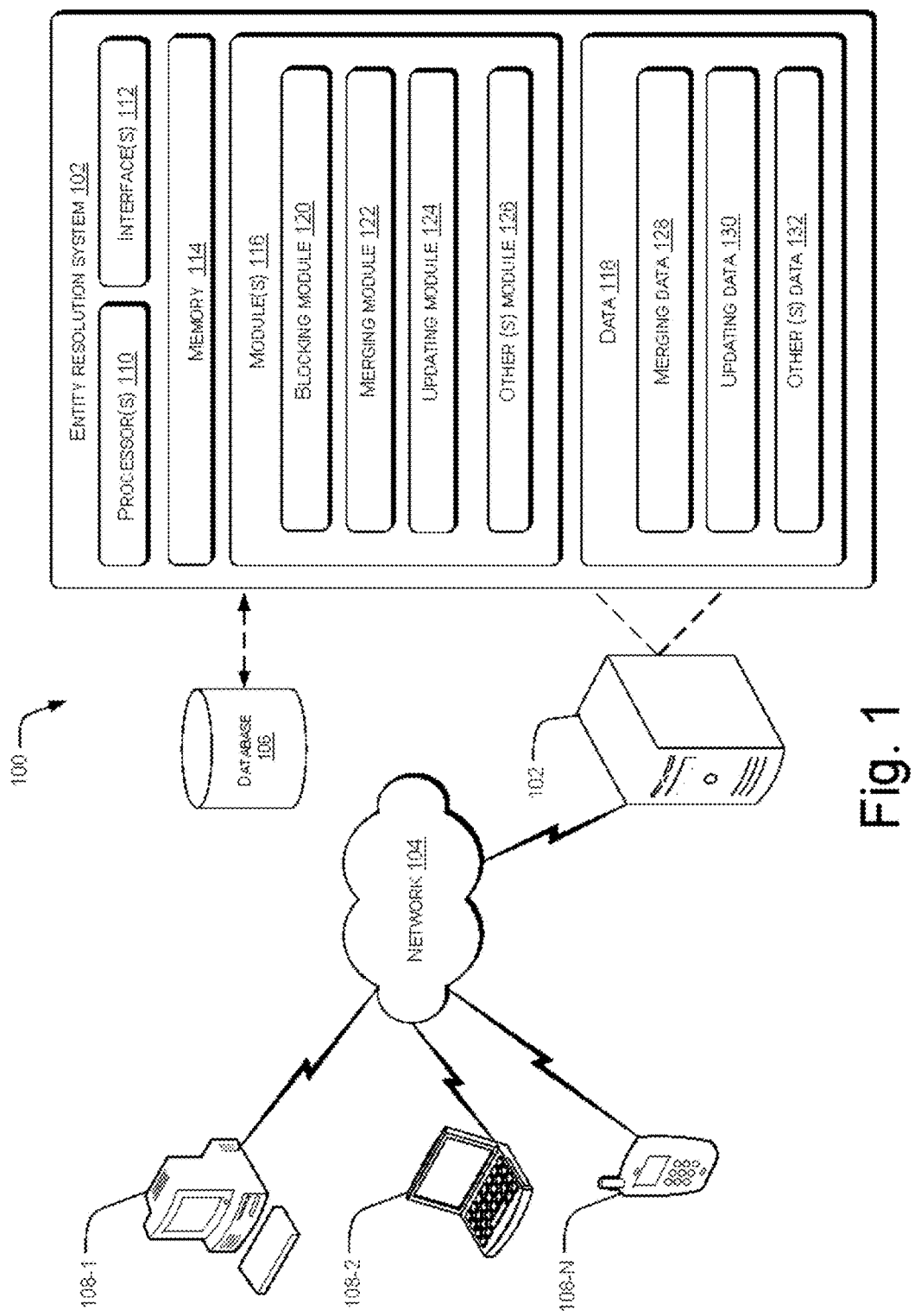
FIG. 1 illustrates a network environment implementing an entity resolution system, in accordance with an embodiment of the present subject matter.

System(s) and method(s) for entity resolution from a plurality of documents are described. The system(s) and method(s) can be implemented in a variety of computing devices, such as laptops, desktops, workstations, tablet-PCs, notebooks, portable computers, tablet computers, internet appliances, and similar systems. However, a person skilled in the art will comprehend that the embodiments of the present subject matter are not limited to any particular computing system, architecture, or application device, as they may be adapted to new computing systems and platforms as they become available.

In the last few decades, Entity Resolution (ER) has emerged as a growing challenge for industries dealing in the realm of data management. Often, multiple records available in various data sources may pertain to same real-world entities. A real-world entity may include, but is not limited to, a person, a product, and an organization. To resolve such situations, ER analysis is performed. ER analysis aims to identify those records that refer to the same entity and once identified, merge those records. In one example, such records can be interchangeably referred to as textual documents. Therefore, in the ER analysis, a plurality of text documents obtained from the various data sources may be matched, in pairs, for determining similarity among the plurality of text documents. Based on the determination, a set of text documents related to an entity may be identified, and the identified set of text documents may then be combined to create a merged document for the entity. As would be understood, the merged document of an entity may include all the details disclosed in each of the identified set of text documents.

Generally, an ER scenario may include retrieving data from a database of records. For discussion purposes, to provide more clarity about the ER analysis, an entity may be considered as a citizen of a country. Generally, each citizen owns one or more identity proofs, such as a passport, a voter ID, a driving license, a credit card, a Permanent Account Number (PAN), a telephone number, and a bank account number. In one example, such records may exist in the form of textual documents. Considering that each citizen owns an average of 3 of the abovementioned IDs, each citizen has at least 3 corresponding textual documents related to him/her. Now taking into account the population of the country, e.g., as N, as well as the number of textual documents associated with each citizen, there may exist approximately 3N textual documents for performing the ER analysis. Further, in light of the textual documents being compared in pairs, approximately $(3N)^2$ comparisons may have to be made to resolve entities from the plurality of textual documents. Also, in one example, the plurality of textual documents may be compared more than once, and therefore, the number of comparisons may increase accordingly. In another example, two merging organizations may wish to combine their customer records. In such a case, the two organizations may have a huge customer base, and each customer may further be represented by multiple records. As can be deduced from the abovementioned examples, large datasets need to be processed to resolve the involved entities, which may be a complex and expensive task.

In order to make the ER analysis scalable, blocking techniques are usually used. Blocking techniques may divide the records in various blocks based on some predefined parameters. For example, textual documents may be divided in different blocks based on textual similarity among the textual documents. Therefore, each block may contain a relatively small number of potentially matching textual documents, and the textual documents within a block may then be compared. However, owing to a large number of attributes associated with a textual document, an accurate blocking of textual documents is always a challenge. For example, a person may have his name as John Smith in his driving license. On the other hand, in a passport, his name may appear as John S. Therefore, even though the driving license and the passport relate to the same person, but on account of being textually dissimilar, the corresponding textual documents may end up in different blocks. Further, since the textual documents are compared within a block, the two textual documents may never be compared. Therefore, the accuracy of the blocking technique is compromised, which, in turn, may also affect an accuracy of the ER analysis.

In addition, as the dynamics associated with the ER analysis may change over a period of time, ER analysis becomes a recurring process. For example, with reference to one of the examples mentioned above, the customer base of an organization may keep on expanding. Therefore, the ER analysis results may have to be updated to accommodate the expanding customer base accordingly. However, generally, in such cases, the ER analysis is performed from scratch. In other words, the whole dataset, i.e., the existing records as well as new records may be processed again to resolve the entities involved. Running the ER analysis afresh, to accommodate any change in the dataset, is a time-extensive process. Also, this may lead to resource wastage as well which, in turn, may adversely affect the economic facet of the ER analysis. As is evident, the conventional ER techniques follow a fragmented approach and offer a time-extensive, inefficient, inaccurate and expensive proposition for the ER analysis.

According to the present subject matter, an entity resolution system, hereinafter referred to as a system, for entity resolution from a plurality of documents is disclosed. In one implementation, the system may obtain the plurality of documents corresponding to a plurality of entities from at least one data source. The plurality of documents may be blocked into at least one bucket, based on textual similarity and inter-document references among the plurality of documents. Further, in each bucket, an iterative match-merge technique may be adopted to resolve the plurality of documents into entities and consequently, to create a merged document for each entity. Once the plurality of documents are resolved into entities in each bucket, a graph clustering technique may be utilized to consolidate the merged documents, from different buckets, pertaining to each entity. As a result, a resolved entity-document for each entity may be generated.

In one implementation, the plurality of documents may be interchangeably referred to as records. As is generally understood, records can include tangible objects, such as paper documents like birth certificates, driver's licenses, and physical medical x-rays, as well as digital information, such as electronic office documents, data in application databases, web site content, and electronic mail (email). Further, the at least one data source may include, but is not limited to, an external database and/or an in-house database. Once the plurality of textual documents is obtained, a graph traversal technique may be employed to block the plurality of textual documents based on inter-document references among the plurality of documents. The inter-document references are indicative of relationships in the plurality of documents. For example, while applying for a passport, a person may provide his/her driving license number as a proof of identity. Therefore, the passport of the person may refer to his/her driving license number and consequently, the two textual documents, referring to the same entity, becomes related.

Along with the blocking of the plurality of textual documents based on the graph traversal technique, the plurality of textual documents may also be blocked by utilizing another blocking technique known as Locality Sensitive Hashing (LSH). In one implementation, the LSH technique may use hash functions for grouping or blocking the plurality of textual documents based on textual similarity among the plurality of textual documents. The ideology behind determining the textual similarity is that the textual documents with similar content are likely to belong to the same real-world entity. For example, if attributes, such as a name, an address, and a phone number are same in two textual documents, there might be a possibility that the two textual documents are related to the same person. Similarly, if the name is same in two textual documents whereas the address and the phone number differ, the possibility of the two textual documents being related to the same person is relatively lesser. Therefore, in order to avoid unnecessary comparisons among the plurality of textual documents, the inter-document references and the textual similarity can be utilized to block the plurality of textual documents into buckets. For example, the textual documents which are determined to be textually similar and those that are related based on the inter-document references can be grouped in the same bucket.

Following the blocking of the plurality of documents into buckets, a pair-wise comparison of the textual documents in each bucket is performed to identify a set of textual documents relating to an entity. In one implementation, the comparison among the textual documents may be performed by an iterative match-merge technique (IMM). In accordance with the iterative match-merge technique, two textual documents may be considered to be matching based on pre-defined criteria. For example, a rule may be defined that two textual documents are said to be matching if the two textual documents have similar entries in a name, an address, an e-mail ID, and a contact number section. Therefore, based on the pre-defined criteria, within each bucket, a set of textual documents pertaining to each entity may be identified. Following the identification, the set of textual documents can be merged to create a merged document for each entity. The merged document of an entity may contain all the information as disclosed in each of the set of textual documents pertaining to the entity. Therefore, within each block, the textual documents are resolved to entities, and such resolved entities are referred to as partial entities.

As mentioned above, the combination of the graph traversal technique and the LSH technique results into buckets of similar textual documents that are resolved into partial entities by creating a merged document for each entity. However, due to probabilistic nature of the LSH technique, a possibility may exist that two textual documents belonging to a single entity may get blocked into more than one bucket. For example, in one instance, the LSH technique may block the plurality of textual documents based on a name attribute. In another instance, the LSH technique may block the plurality of textual documents based on an address attribute. Therefore, although two textual documents may relate to same entity, the two textual documents may be blocked into different buckets. Further, for the same entity, a merged document may be created in more than one bucket. In other words, as a result of the IMM technique, multiple partial entities belonging to the same entity can be obtained from multiple buckets.

In an implementation, partial entities from different buckets may be connected by the fact that the partial entities may share the same textual document. For discussion purposes, each textual document may be visualized as a node in a graph of textual documents in accordance with the graph clustering technique. As mentioned earlier, each partial entity may have a number of associated textual documents, and each textual document may be represented by a node in the graph. Further, for each partial entity, one of the nodes may be considered as a central node, and an edge between the central node and each of the remaining nodes of the partial entity is created. Similar node-edge structures may be created for each partial entity. In case, a textual document is shared by a pair of partial entities, the textual document may appear in the node-edge structure of each of the pair of partial entity. In such a case, all the nodes belonging to the two partial entities may be connected, and may be considered to be belonging to the same entity. Therefore, the connected nodes, i.e., the connected textual documents can be consolidated to form an entity-resolved document for the entity. As would be gathered, an entity-resolved document of an entity may include all the information pertaining to the entity as disclosed in each of the plurality of textual documents.

In one implementation, a new set of textual documents may be added to the data source for ER analysis. In such an implementation, the ER analysis may be continued without being restarted, and the new set of textual documents may be accommodated in the analysis based on the ER analysis already performed. The new set of textual documents may be processed using graph traversal technique, LSH technique, IMM technique, and graph clustering technique as mentioned above. In the present subject matter, rather than carrying out the ER analysis from scratch, the new set of textual documents may be directly analyzed with regard to the already resolved entities and the corresponding entity-resolved documents, thereby saving time taken for the analysis. In one implementation, upon receiving the new set of textual documents, a new textual document may get associated to previously resolved entities. In another implementation, a new textual document or the new set of the textual documents may form a new entity.

As would be gathered, utilization of graph traversal technique in combination with LSH technique, for blocking the textual documents, ensures better accuracy of blocking the textual documents. Further, utilization of the graph clustering technique may assist in an accurate resolution of the entities. In addition, a new set of textual documents can easily be accommodated in the ER analysis without having to reinitiate the ER process from scratch. This would save the resources and time to be utilized for reanalysis. Also, the associated cost of operation may be reduced accordingly. Therefore, the present subject matter provides a comprehensive and exhaustive approach for a time-saving, accurate, and inexpensive ER analysis These and other advantages of the present subject matter would be described in greater detail in conjunction with the following figures. While aspects of described system(s) and method(s) for entity resolution from documents can be implemented in any number of different computing systems, environments, and/or configurations, the embodiments are described in the context of the following exemplary system(s).

FIG. 1 illustrates a network environment 100 implementing an entity resolution system 102, also referred to as system 102, according to an embodiment of the present subject matter. In the network environment 100, the system 102 is connected to a network 104. Further, the system 102 is connected to a database 106. Additionally, the network environment 100 includes one or more user devices 108-1, 108-2 . . . 108-N, collectively referred to as user devices 108 and individually referred to as user device 108, connected to the network 104.

The system 102 can be implemented as any set of computing devices connected to the network 104. For instance, the system 102 may be implemented as workstations, personal computers, desktop computers, multiprocessor systems, laptops, network computers, minicomputers, servers, and the like. In addition, the system 102 may include multiple servers to perform mirrored tasks for users.

Furthermore, the system 102 can be connected to the user devices 108 through the network 104. Examples of the user devices 108 include, but are not limited to personal computers, desktop computers, smart phones, PDAs, and laptops. Communication links between the user devices 108 and the system 102 are enabled through various forms of connections, for example, via dial-up modem connections, cable links, digital subscriber lines (DSL), wireless or satellite links, or any other suitable form of communication.

Moreover, the network 104 may be a wireless network, a wired network, or a combination thereof. The network 104 can also be an individual network or a collection of many such individual networks interconnected with each other and functioning as a single large network, e.g., the internet or an intranet. The network 104 can be implemented as one of the different types of networks, such as intranet, local area network (LAN), wide area network (WAN), the internet, and such. The network 104 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 104 may include network devices, such as network switches, hubs, routers, host bus adapters (HBAs), for providing a link between the system 102 and the user devices 108. The network devices within the network 104 may interact with the system 102 and the user devices 108 through communication links.

In said embodiment, the system 102 includes one or more processor(s) 110, interface(s) 112, and a memory 114 coupled to the processor 110. The processor 110 can be a single processing unit or a number of units, all of which could also include multiple computing units. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor 110 is configured to fetch and execute computer-readable instructions and data stored in the memory 114.

The interfaces 112 may include a variety of software and hardware interfaces, for example, interface for peripheral device(s), such as a keyboard, a mouse, an external memory, and a printer. Further, the interfaces 112 may enable the system 102 to communicate with other computing devices, such as web servers, and external data repositories, such as the database 106, in the network environment 100. The interfaces 112 may facilitate multiple communications within a wide variety of protocols and networks, such as a network 104, including wired networks, e.g., LAN, cable, etc., and wireless networks, e.g., WLAN, cellular, satellite, etc. The interfaces 112 may include one or more ports for connecting the system 102 to a number of computing devices.

The memory 114 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The non-transitory computer-readable medium, however, excludes a transitory, propagating signal.

The system 102 also includes module(s) 116 and data 118. The module(s) 116 include routines, programs, objects, components, data structures, etc., which perform particular tasks or implement particular abstract data types. In one implementation, the module(s) 116 include a blocking module 120, a merging module 122, an updating module 124 and other module(s) 126. The other module(s) 126 may include programs or coded instructions that supplement applications and functions of the system 102.

On the other hand, the data 118 inter alia serves as a repository for storing data processed, received, and generated by one or more of the module(s) 116. The data 118 includes, for example, merging data 128, updating data 130, and other data 132. The other data 132 includes data generated as a result of the execution of one or more modules in the module(s) 116.

In one implementation, the system 102 may resolve entities from a plurality of documents, which may be interchangeably referred to as records. As is generally understood, records can include tangible objects, such as paper documents like birth certificates, driver's licenses, and physical medical x-rays, as well as digital information, such as electronic office documents, data in application databases, web site content, and electronic mail (email). For this, in one implementation, the blocking module 120 may obtain the plurality of documents from at least one data source. Each of the plurality of documents may pertain to a real-world entity, e.g., a person, a product or an organization. Generally, the plurality of documents may exist in form of textual documents, and may include at least one attribute. For example, a passport may have attributes, such as name, father's name, address, data-of-birth and contact number. The attributes may further be categorized as soft attributes, hard attributes and unique attributes.

In a textual document, a soft attribute may be understood as an attribute for which two entries or values may be considered to be matching even if the two entries are not textually identical. For example, different variations of a person's name may be considered to be matching even if they are not textually identical, e.g., R Scott and Roger Scott. On the other hand, a hard attribute may be understood as an attribute for which two entries may considered to be matching only if the two entries are textually identical, e.g., a telephone number. Further, a unique attribute may be understood as an attribute that has a unique entry for each entity, e.g., a passport number. As is generally understood, each individual can have only one passport number, and therefore, two entities may not share the same passport number.

Further, an entity may have multiple values for a soft attribute and a hard attribute, but not for a unique attribute.

For example, a person may have multiple ways of writing his/her name and multiple telephone numbers. However, a person may not have multiple passport numbers. Also, two entities may have the same value for a soft attribute and a hard attribute but can not have the same value for a unique attribute. For example, more than one person may share the same name and the same phone number, but they can not share the same passport number.

In one implementation, a textual document may contain a reference to another textual document when an attribute of the textual document contains a value of a hard attribute or a unique attribute of the other textual document. For example, in a passport of an entity, an attribute named "Driving License ID" may provide reference to a driving license of the entity by containing the driving license id value, which is a unique attribute of the driving license. Such attributes of a textual document, which may provide a reference to another textual document, are called referential attributes. Therefore, the referential attributes may provide inter-document references among the plurality of textual documents.

In one implementation, the referential attributes may further be categorized as explicit referential attributes and implicit referential attributes. An explicit referential attribute may be understood as an attribute whose value may be an exact value of a hard or a unique attribute of a referred textual document. For example, if a passport document has an attribute "Driving License ID" with a value equal to "DL123", then the passport document makes an explicit reference to a driving license document with a registration number "DL123". On the other hand, in case of an implicit referential attribute, a part of its value may contain a hard or a unique attribute of another textual document. For example, if a value of a "Description" field in the passport document is "Applicant's DL# DL123", then the passport document is making an implicit reference to the driving license document.

Consider an example where the blocking module 120 may obtain 11 textual documents, $d_1$, $d_2$, $d_3$, $d_4$, $d_5$, $d_6$, $d_7$, $d_8$, $d_9$, $d_{10}$, and $d_{11}$ belonging to 4 entities, $e_1$, $e_2$, $e_3$, and $e_4$. The 11 textual documents are tabulated with their corresponding details in Table 1. The example is provided for the sake of providing a better clarity and understanding of the present subject matter, and should not be construed as limiting.

TABLE 1

| Entity ID |␣␣ ID | Document ID | Name (SA) | Email ID (HA) | Phone No. (HA) | D-O-B (SA) | Address (SA) | Proof ID (RA) | Details (RA) |
|---|---|---|---|---|---|---|---|---|---|
| $e_1$ | $d_1$ | PAN11 | J B Smith | NULL | NULL | NULL | ABC | VOT 21 | |
| $e_1$ | $d_2$ | VOT21 | John Smith | NULL | NULL | Aug. 17, 1977 | ABC | | |
| $e_1$ | $d_3$ | DL32 | John B Smith | a@x.com | 510 | 17 Aug. 1977 | ABD | VOT 21 | |
| $e_1$ | $d_4$ | BAN64 | John Blake Smith | a@x.com | 510 | Aug. 17, 1977 | ABC | | |
| $e_2$ | $d_5$ | PAN57 | W L Schneider | b@x.com | 951 | 24 Nov. 1962 | XYZ | | |
| $e_2$ | $d_6$ | BAN26 | Winifred Lela Schneider | b@y.com | NULL | NULL | XYZ | | Driving License ID: DL77 |
| $e_2$ | $d_7$ | DL77 | Winifred Schneider | b@y.com | 951 | 24 Nov. 1962 | PQR | | |
| $e_3$ | $d_8$ | VOT89 | Jacobson Rulz | c@g.com | NULL | 24 Jun. 1969 | MNO | | |

TABLE 1-continued

| Entity ID | Document ID | Name (SA) | Email ID (HA) | Phone No. (HA) | D-O-B (SA) | Address (SA) | Proof ID (RA) | Details (RA) |
|---|---|---|---|---|---|---|---|---|
| $e_3$ | $d_9$ | BAN91 | J E Rulz | c@g.com | 888 | 24 Jun. 1969 | RST | |
| $e_3$ | $d_{10}$ | PAN68 | Jacobson Rulz | c@g.com | 838 | 24 Jun. 1969 | MNO | |
| $e_4$ | $d_{11}$ | DL11 | Carla Rulz | NULL | 848 | NULL | ABZ | Father's Account No.: BAN91 |

As can be seen from the table 1, the textual documents $d_1$ to $d_4$ belong to the entity $e_1$, the textual documents $d_5$ to $d_7$ belong to the entity $e_2$, the textual documents $d_8$ to $d_{10}$ belong to the entity $e_3$, and the textual document $d_{11}$ belongs to the entity $e_4$. The textual documents cited in the table 1 are of 4 types, i.e., Permanent Account Number (PAN) document, Voter ID (VOT) card document, Driving License (DL) document and Bank Account Number (BAN) document. Further, the attributes of the abovementioned textual documents, which are considered for the ER analysis, are Document ID, Name, Email ID, Phone number, Date of Birth, Address, Proof ID, and Document Details.

Once the blocking module 120 obtains the plurality of textual documents, the blocking module 120 may block the plurality of textual documents based on inter-document references by employing a document traversal technique. The document traversal technique is equivalent to a graph traversal technique, where elements acting as nodes may be traversed through their connecting edges to derive details about the elements. Further, the inter-document references are indicative of relationships in the plurality of textual documents. As mentioned earlier, the inter-document references among the plurality of textual documents may be identified through the corresponding referential attributes.

Now, in order to get a better understanding of the application of document traversal technique for entity resolution, the plurality of textual documents may be visualized as nodes in a graph, and the inter-document references may be considered as directed edges. For example, if a textual document $d_i$ may refer to a textual document $d_j$, either explicitly or implicitly, then an edge may be directed from $d_i$, i.e., a source textual document, to $d_j$, i.e., a referred textual document. Therefore, based on the inter-document references, the blocking module 120 may generate a traversal set for each textual document. A traversal set of a textual document may be understood as a set of textual documents connected to the textual document, either through explicit references or implicit references.

In one implementation, the document traversal technique can be split-up in two steps, namely, a downstream traversal (DST) and an upstream traversal (UST). In such an implementation, the blocking module 120 may generate a traversal set for a textual document by combining a downstream traversal set and an upstream traversal set. The DST may be understood as moving downwards in the graph, i.e., starting from a node (textual document), and traversing the graph along the direction of the edges. Therefore, in DST, the blocking module 120 may traverse the plurality of textual documents by starting from a source textual document and moving towards a corresponding referred textual document. Further, by using the DST, the blocking module 120 may utilize the explicit referential attributes, i.e., the explicit inter-document references in the plurality of textual documents.

In order to provide a better clarity about the DST, the example cited in the table 1 may be considered. As per the table 1, considering the cited explicit references, the textual document $d_1$ provides an explicit reference to the textual document $d_2$. Similarly, the textual document $d_3$ may provide an explicit reference to the textual document $d_2$. Therefore, a downstream traversal set for the textual documents $d_1$ and $d_3$ is $\{d_2\}$. As can be seen, there are no other explicit references among the 11 textual documents cited in the table 1.

Considering another example, where a textual document $r_1$ explicitly refers to a textual document $r_2$, the textual document $r_2$ explicitly refers to a textual document $r_3$, and the textual document $r_3$ explicitly refers to a textual document $r_4$ and a textual document $r_5$. In the present example, a downstream traversal set for the textual documents $r_1$, $r_2$ and $r_3$ is $\{r_2, r_3, r_4, r_5\}$, $\{r_3, r_4, r_5\}$ and $\{r_4, r_5\}$, respectively. On the other hand, a downstream traversal set for the textual documents $r_4$ and $r_5$ is $\{/\}$, i.e., null.

Further, in the present context, the UST may be understood as traversing the plurality of textual documents in a direction opposite to the edge-direction, i.e., from a referred textual document towards a corresponding source textual document. The blocking module 120 may utilize the explicit references as well as the implicit references of the plurality of textual documents by using the UST. Referring to the example cited in the table 1, the blocking module 120 may generate an upstream traversal set for the textual document $d_7$ the textual document $d_9$ and the textual document $d_2$ as $\{d_6\}$, $\{d_{11}\}$ and $\{d_1, d_3\}$, respectively. On the other hand, an upstream traversal set for rest of the textual documents is $\{/\}$, i.e., null.

Continuing with the example mentioned earlier, the textual document $r_1$ makes an implicit reference to the textual document $r_2$, which, in turn, makes implicit references to the textual document $r_3$ and the textual document $r_4$. Further, the textual document $r_1$ makes an explicit reference to the textual document $r_5$. In this case, the blocking module 120 may generate an upstream traversal set for the textual document $r_2$ as $\{r_1\}$. Similarly, an upstream traversal set for the textual document $r_3$ and the textual document $r_4$ may be generated as $\{r_2\}$. Further, an upstream traversal set for the textual document $r_5$ and the textual document $r_1$ may be generated as $\{r_1\}$ and $\{/\}$, respectively.

For each textual document, following the generation of an upstream traversal set and a downstream traversal set, the blocking module 120 may combine the upstream traversal set and the downstream traversal set to generate a corresponding traversal set. In one implementation, for generating a traversal set for a textual document, hereinafter referred to as a starting textual document, the blocking module 120 may perform a single step of DST on the starting textual document, and a downstream traversal set thus obtained is added to a corresponding traversal set.

Subsequently, the blocking module 120 may perform a single step of UST for the textual documents collected in the traversal set and the starting textual document itself. The blocking module 120 may further add textual documents retrieved, on account of execution of the single step of UST, to the traversal set. The blocking module 120 may keep executing the DST-UST step repeatedly on the textual documents that get added to the traversal set after each DST-UST step.

In certain cases, the blocking module 120 may, by executing the UST on a textual document, retrieve a large number of textual documents that may not even belong to the same entity. For example, a homepage-Unique Resource Location (URL) of an organization may appear as an implicit reference in textual documents belonging to employees of the organization. In addition, if the homepage-URL also appears as a value of an explicit referential attribute in a textual document, then the UST for this textual document may retrieve a large number of textual documents. In fact, most of the textual documents so retrieved are very unlikely to belong to the same entity to which the textual document may belong. In order to avoid such situations, the blocking module 120 may define a threshold for a number of textual documents retrieved in a single step of UST for a textual document. Therefore, when the number of textual documents retrieved is more than a threshold, the blocking module 120 may not add the retrieved textual documents to the traversal set.

As would be gathered, once the blocking module 120 may block the plurality of textual documents based on the inter-document references, each textual document may have a corresponding traversal set including textual documents potentially belonging to the same entity as the textual document.

In addition, the blocking module 120 may utilize a Locality Sensitive Hashing (LSH) technique for also blocking the plurality of textual documents. The LSH technique may utilize hash functions for blocking the plurality of textual documents into one or more buckets based on textual similarity among the plurality of textual documents. In one implementation, the blocking module 120 may hash the plurality of textual documents with bucket IDs. Therefore, textual documents with high textual similarity are likely to get at least one same hash-value, i.e., same bucket ID. On the other hand, textual documents, which are not textually similar are less likely to get hashed to the same bucket.

Further, in case two textual documents A and B have a large number of words in common, the textual documents A and B may be considered for further comparisons as compared to a pair of textual documents, which may vary textually. In one implementation, the blocking module 120 may hash potentially matching textual documents with the same value and therefore, may block the potentially matching textual documents hashed with the same value in the same bucket. Further, for each textual document, the blocking module 120 may put a corresponding traversal set of textual documents in the same bucket that the textual document belongs to, in order to utilize blocking results achieved by executing the document traversal.

In one implementation, each bucket may be understood as a key-value pair. The key may be understood as a corresponding bucket-ID, and value is a group of textual documents, which may get hashed to this 'key' along with their traversal sets. Therefore, once the blocking module 120 may hash each of the plurality of textual documents to their respective bucket IDs, each bucket may contain textual documents, which either may have high textual similarity, or share explicit and/or implicit references. Referring to the example cited in the table 1, the textual document $d_5$ and the textual document $d_7$ have high textual similarity and therefore, the blocking module 120 may block the textual document $d_5$ and the textual document $d_7$ in the same bucket by hashing the textual document $d_5$ and the textual document $d_7$ with the same bucket ID. Also, since the traversal set for the textual document $d_7$ is $\{d_6\}$, the blocking module 120 may also block the textual document $d_6$ along with the textual document $d_7$ in the same bucket.

Figure 1A:
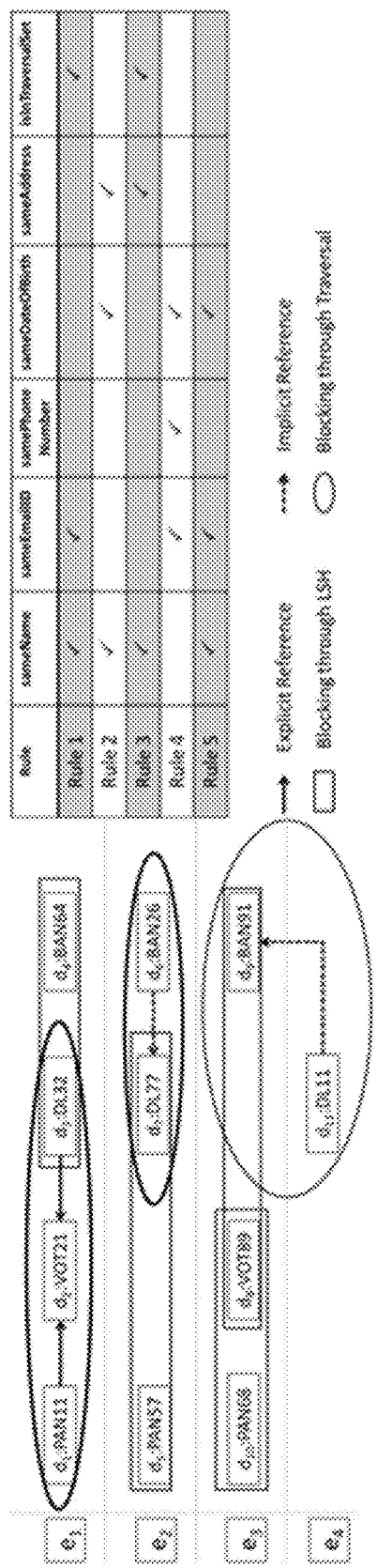
FIG. 1(a) illustrates blocking of a plurality of documents based on textual similarity and inter-document references, and sample rules for determining matching documents, in accordance with an embodiment of the present subject matter.

With reference to the textual documents cited in the example mentioned in the table 1, FIG. 1(a) illustrates the blocking of the textual documents $d_1$, $d_2$, $d_3$, . . . $d_{11}$ by the blocking module 120 based on the textual similarity and the inter-document references. As illustrated in FIG. 1(a), circular or oval blocks depict blocking of the textual documents based on document traversal technique, i.e., inter-document references. Similarly, rectangular blocks depict blocking of the textual documents based on LSH techniques, i.e., textual similarity. Further, for a better clarity and understanding of the present subject matter, FIG. 1 (a) should be referred to in conjunction with FIG. 1. In one implementation, details pertaining to the blocking module 120 may be stored in the merging data 128.

Following the blocking of the plurality of textual documents into buckets, the merging module 122 may perform a pair-wise comparison of the textual documents in each bucket to identify a set of textual documents relating to an entity. In one implementation, the merging module 122 may perform the comparison among the textual documents by an iterative match-merge technique (IMM). In another implementation, the merging module 122 may employ an R-swoosh based IMM technique for performing the comparison.

In one implementation, the merging module 122 may consider two textual documents as "Matching" if the two textual documents may return a value, e.g., "True" under some match function. In one implementation, a match function may be a Boolean function defined over two textual documents that may return "True", when the two textual documents are determined to be belonging to the same entity. On the other hand, in case the two textual documents may return a value "False", the two textual documents are determined to be not-matching. Further, the match functions can be implemented in multiple ways. In one implementation, a match function may be based on at least one rule defined over attribute values of the two textual documents being compared. For example, a match function may be defined that the two textual documents may return "True", if (name matches) AND (address matches) AND (date-of-birth matches). Otherwise, the two textual documents may return "False".

In one implementation, within a bucket, the merging module 122 may divide the textual documents into two sets, e.g., a set X and a set Y. The set X may contain all the textual documents from a bucket, and the set Y may contain the textual documents, which may already have been compared with each other. As would be gathered, at the starting of the execution of the IMM technique, the set Y may be empty. In such an implementation, the merging module 122 may, within each bucket, compare two textual documents to start the execution of the IMM technique. Once, the set Y may include at least one textual document which is compared with at least one of the textual documents from the bucket, the merging module 122 may iterate over each of the textual documents in the set A. For example, the merging module 122 may remove a textual document D from the set A, and may then compare the textual document D with each textual document available in the set B. In case the textual document D may not have a matching textual document in the set B, the merging module 122 may add the textual document D to the set B.

On the other hand, if the textual document D may have a matching textual document P in the set B, then the merging module 122 may remove the textual document P from the set B. In continuation to the removal of the textual document P from the set B, the merging module 122 may merge the textual document D and the textual document P to create a merged textual document DP. Further, the merging module 122 may add the merged textual document DP to the set A. As would be gathered, although the textual document D may not match any other textual document in the set B, the merged textual document DP may match a textual document in the set B. Therefore, by the end of the IMM process, the set A may be empty, and the set B may contain the final result of the IMM process, i.e., the merged documents corresponding to a plurality of entities. As would be gathered, in each bucket, the merging module 122 may create a merged document for each entity. The merged document of an entity may contain all the information as disclosed in each of the textual documents, within the bucket, pertaining to the entity. In other words, within each block, the merging module 122 may resolve the textual documents to entities. The entities resolved from the textual documents within a block are referred to as partial entities.

Further, the merging module 122 may not compare a pair of textual documents twice. In one implementation, the merging module 122 may maintain two sets of textual documents. One of the sets may pertain to matching pairs of textual documents, and the other set may pertain to non-matching pairs of textual documents. In case a pair of textual documents, which may already be compared in a bucket, is encountered again in another bucket, the merging module 122 may not compare the pair of textual documents by computing a "Match function" again. In fact, in such situations, if the pair of textual documents exists in the set of matching pairs, then the merging module 122 may take the value of Match function as "True". However, if the pair of textual documents exists in the set of non-matching pairs, then the merging module 122 may take the value as "False". However, if the pair of textual documents may not exist in any of the two sets, the merging module 122 may then compute the "Match function" for that pair. Based on a return value of the Match function, the merging module 122 may update the set of matching pairs or the set of non-matching pairs accordingly.

In one implementation, the textual documents pertaining to the same entity may co-occur in multiple buckets. Further, as a result of the IMM technique executed by the merging module 122, same entity can be obtained from multiple buckets. Therefore, the entities obtained from each bucket may be referred to as partial entities. In one implementation, the merging module 122 may combine the partial entities from all the buckets to get final resolved entities.

In case any two partial entities belonging to different buckets share a common textual document, the merging module 122 may combine the partial entities, i.e., the merged documents corresponding to each of the partial entities may be merged again to create a resolved-entity document for each entity. In other words, the merging module 122 may combine all the textual documents pertaining to the two partial entities to get one entity.

Figure 1B:
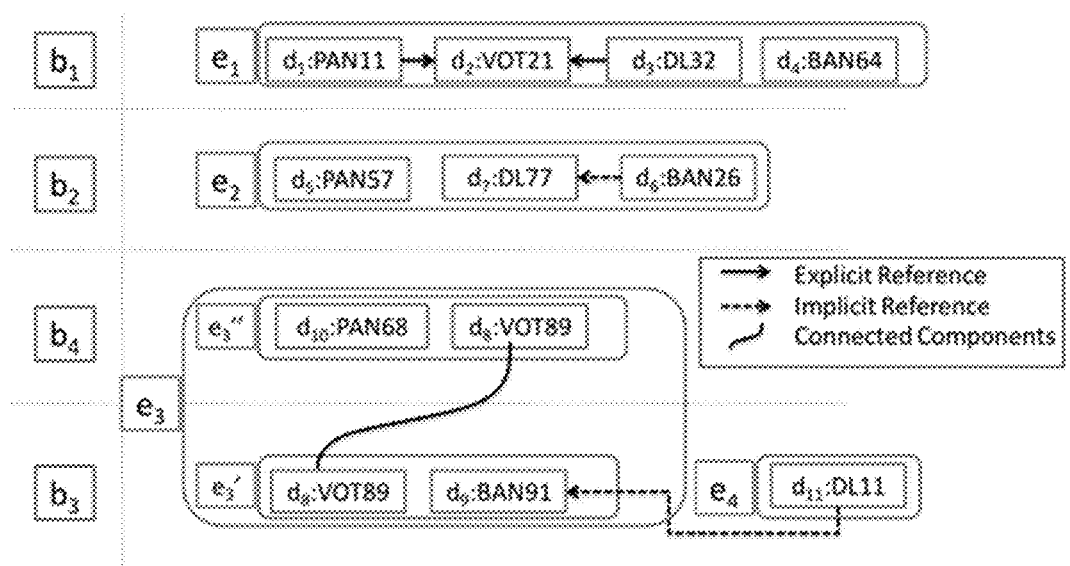
FIG. 1(b) illustrates an outcome of entity resolution from a plurality of documents, in accordance with an embodiment of the present subject matter.

With reference to the textual documents cited in the example mentioned in the table 1, FIG. 1(b) illustrates the textual documents $d_1$, $d_2$, $d_3$, . . . $d_{11}$ being resolved in buckets by the merging module 122. For a better understanding and clarity of the present subject matter, FIG. 1(b) should be referred in conjunction with FIG. 1. Now, as can be deduced from the table 1, the textual documents $d_8$, $d_9$, and $d_{10}$ belonging to the same entity $e_3$ do not share any references to each other. Further, as shown in FIG. 1(b), the textual document $d_8$ and the textual document $d_9$ may end up in a bucket $b_3$ based on textual similarity. Similarly, the textual documents $d_8$ and $d_{10}$ end up being in the bucket $b_4$. Therefore, as would be gathered, there may not be a bucket which has all the textual documents belonging to $e_3$ in it. In the bucket $b_3$, the merging module 122 employs the IMM technique to produce a partial entity $e'_3$=Merge ($d_8$, $d_9$). In the bucket $b_4$, the merging module 122 may resolve another partial entity $e''_3$=Merge ($d_8$, $d_{10}$).

In one implementation, the merging module 122 may combine such partial entities by identifying connected components (CC) in an undirected graph. For the sake of understanding, the plurality of textual documents can be considered as nodes of an undirected graph. Therefore, for each textual document, there is one node in the graph. Now, for each partial entity, the merging module 122 may arbitrarily select one of the nodes as a central node. Then, the merging module 122 may provide an edge between the central node and each of the remaining nodes of the partial entity. Therefore, all the nodes of a partial entity are connected to each other through the central node.

As can be seen from FIG. 1(a), a bucket $b_1$ may have a partial entity $e_1$=Merge ($d_1$, $d_2$, $d_3$, $d_4$). In case if the merging module 122 may select the textual document $d_1$ as the central node for $e_1$, the edges formed may be {$d_1$-$d_2$, $d_1$-$d_3$, $d_1$-$d_4$}. Now, in case if any two partial entities have any node, i.e., a textual document in common, then it may be understood that all the nodes in the two partial entities are connected, and therefore, belong to the same entity. As would be gathered, a connected component in the graph corresponds to one entity. Therefore, the merging module 122 may consolidate the results of the buckets by finding connected components in the graph by a graph clustering technique.

Continuing with the example cited in the table 1, the merging module 122 may add the pair $d_8$-$d_9$ to an edge-list from bucket $b_3$, and the pair $d_8$-$d_{10}$ to the edge-list from bucket $b_4$. In one implementation, the merging module 122 may identify the $d_8$-$d_9$-$d_{10}$ as a single connected component $c_3$. Further, the merging module 122 may merge the textual documents $d_8$, $d_9$, and $d_{10}$ to get a final resolved entity $e_3$=Merge ($d_8$, $d_9$, $d_{10}$) and therefore, the corresponding resolved entity-document.

For providing a better clarity of the present subject matter, a table 2 is provided below. The table 2 tabulates, with reference to the table 1, an outcome of the abovementioned analysis. Further, the table 2 is provided for providing a better understanding of the subject matter and should not be construed as limiting.

TABLE 2

| Bucket-ID | Documents grouped by LSH (with their traversal set) Document-ID: {Traversal Set} | Resulting Documents in Bucket | Partial Entities | Edge List | Connected Components | Final Resolved Entities |
|---|---|---|---|---|---|---|
| $b_1$ | $d_3$: {$d_2$, $d_1$}, $d_4$: { } | $d_1$, $d_2$, $d_3$, $d_4$ | $e_1'$: Merge {$d_1$, $d_2$, $d_3$, $d_4$} | $d_1$-$d_2$ $d_1$-$d_3$ $d_1$-$d_4$ | $C_1$: {$d_1$, $d_2$, $d_3$, $d_4$} $C_2$: {$d_5$, $d_6$, $d_7$} | $e_1$: Merge($d_1$, $d_2$, $d_3$, $d_4$) |
| $b_2$ | $d_5$: { }, $d_7$: {$d_6$} | $d_5$, $d_6$, $d_7$ | $e_2'$: Merge {$d_5$, $d_6$, $d_7$} | $d_5$-$d_6$ $d_5$-$d_7$ $d_8$-$d_9$ | $C_3$: {$d_8$, $d_9$, $d_{10}$} $C_4$: {$d_{11}$} | $e_2$: Merge($d_5$, $d_6$, $d_7$) |
| $b_3$ | $d_8$: { }, $d_9$: {$d_{11}$} | $d_8$, $d_9$, $d_{11}$ | $e_3'$: Merge {$d_8$, $d_9$} $e_4'$: $d_{11}$ | $d_8$-$d_{10}$ $d_{11}$-$d_{11}$ | | $e_3$: ($d_8$, $d_9$, $d_{10}$) |
| $b_4$ | $d_8$: { }, $d_{10}$: { } | $d_8$, $d_{10}$ | $e_3''$: Merge ($d_8$, $d_{10}$) | | | $e_4$: $d_{11}$ |

In one implementation, the blocking module 120 may obtain a new batch of textual documents. Once the new batch of textual documents may be obtained, the updating module 124 may block the new batch of textual documents into blocks by document traversal technique as mentioned earlier. The updating module 124, for each textual document, may generate a corresponding traversal set. In the present implementation, the traversal set may include textual documents from the new batch of textual documents as well as the old batch of textual documents. For the present implementation, the plurality of textual documents obtained initially by the blocking module 120 may be referred to as an old batch of textual documents.

In case a traversal set for a new textual document may include a textual document from the old batch, the updating module 124 may replace the textual document by a corresponding already resolved entity. Therefore, the traversal set of a new textual document may contain textual documents as well as entities. Further, a textual document in the traversal set of the new textual document may have to be from the new batch of textual documents, and the entities are those that have been previously resolved.

As mentioned earlier, following the generation of traversal sets for each new textual document, the updating module 124 may block the new batch of the textual documents by the LSH technique. In one implementation, the updating module 124 may hash the new textual documents with bucket-ids, which may have been created earlier during the blocking of the old batch of textual documents.

The updating module 124 may retrieve the IDs of the old textual documents that got hashed to such bucket-ids from a previously created LSH index. The LSH index may be understood as a database of the plurality of textual documents with their corresponding IDs or hash tags, and the bucket IDs they are blocked in. The updating module 124 may further retrieve the corresponding old resolved entities for these document-ids. Therefore, there may be two types of buckets existing now. One of the two types of buckets may include old entities, which are obtained either through document traversal or through LSH on a new textual document. The second type of bucket may include textual documents from the new batch of textual documents.

Once the new batch of textual documents may be blocked in the two types of buckets, the updating module 124, in each bucket, may employ the IMM technique on the new textual documents as well as the entities. In the present implementation, the partial entity so created may include one of at least one new textual document, at least one new textual document and at least one old entity, and a not-updated old entity. In case a partial entity may include at least one new textual document or a not-updated old entity, the updating module 124 may identify the edge lists as explained earlier.

On the other hand, if a partial entity may include at least one new textual document and at least one old entity, the updating module 124 may create an edge-list for the at least one textual document and the at least one old entity. As mentioned in a previous implementation, a textual document (node) may be considered as a central node and the remaining textual documents (nodes) are connected to it. In such an implementation, the updating module 124 may identify connected components for the textual documents (nodes), which are a part of the partial entities obtained for the new batch of textual documents, and not for the old batch. Therefore, in case of obtaining of the new batch of textual documents, the updating module 124 may employ the graph clustering technique for all the new textual documents and a few of the old textual documents. In one implementation, the updating module 124 may update the resolved entity-document for some of the old textual documents. For example, the previously separate entities may get merged because of the new information obtained from the new batch of textual documents.

In continuation to the example cited in the table 1, consider that the textual document $d_3$ was not included in the old batch of textual documents. In the absence of the textual document $d_3$, it may not be possible to get the textual documents $d_1$, $d_2$, and $d_4$ in the same bucket. Therefore, there may be two entities corresponding to the entity $e_1$, i.e., $e_{\cdot_1}$=Merge ($d_1$, $d_2$), and $e_{\cdot_1}$=$d_4$, which may be present in the previously resolved entity-document collection. Now, in the present implementation, when the textual document $d_3$ may come as a part of the new batch of textual documents, the textual document $d_3$ may be linked to the textual documents $d_1$ and $d_2$ on the basis of document traversal. Further, since the textual document $d_3$ has high textual similarity with the textual document $d_4$, the updating module 124 may generate at least one bucket-id including the textual document $d_3$ as well as the textual document $d_4$. Therefore, the textual document $d_3$ with the corresponding traversal set {$e_{\cdot_1}$} may be present in a bucket with the entity $e''_1$. As would be gathered, the new textual documents and previously resolved entities belonging to the entity $e_1$ may end up in the same bucket, and therefore, the entity $e_1$ may be resolved. Further, at the same time, the inconvenience of re-resolving the entire document collection is avoided.

Figure 2:
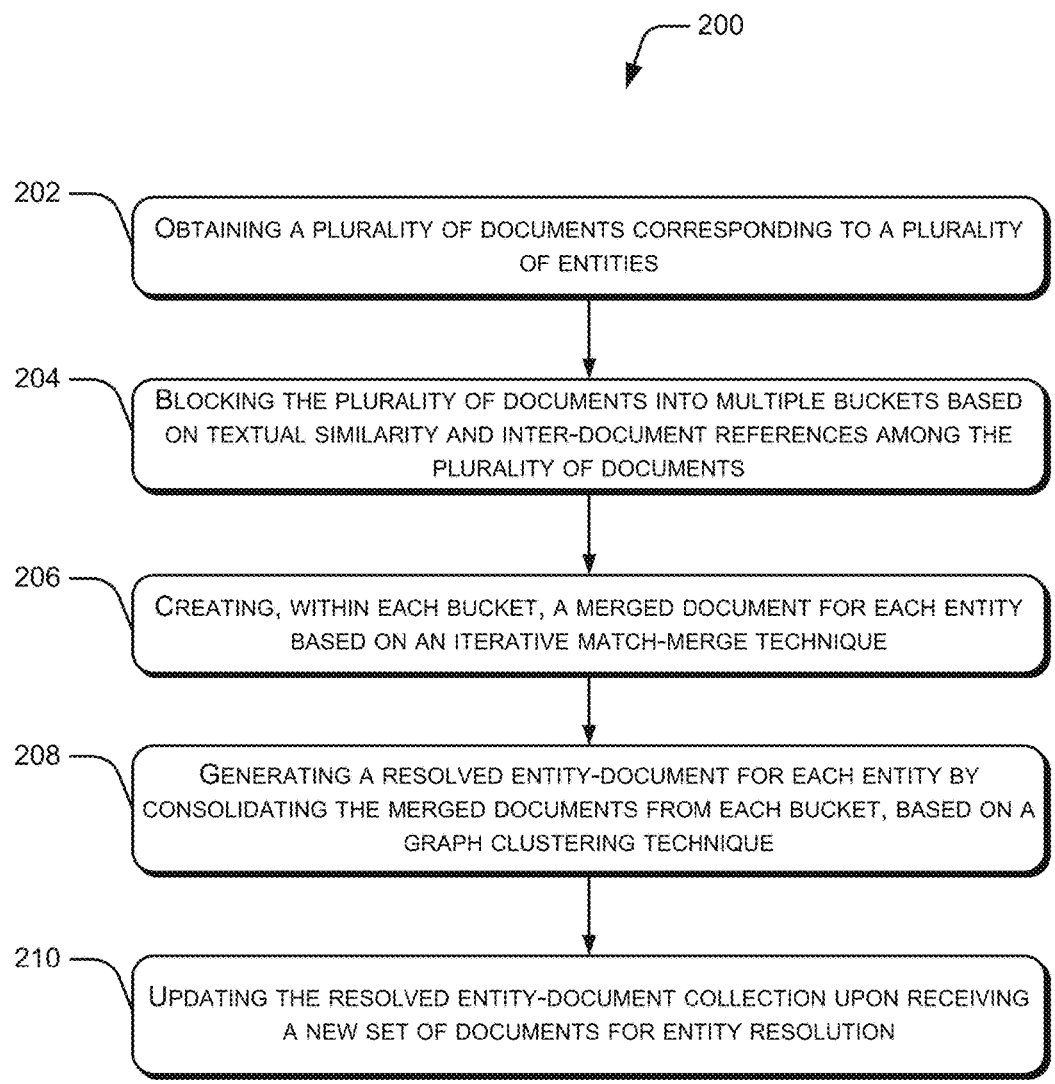
FIG. 2 illustrates a method for entity resolution from a plurality of documents, in accordance with an embodiment of the present subject matter.

FIG. 2 illustrates a method 200 for providing an automated response to a feedback, according to one embodiment of the present subject matter. The method 200 may be implemented in a variety of computing systems in several different ways. For example, the method 200, described herein, may be implemented using an entity resolution system 102, as described above.

The method 200, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the method can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the described method 200.

The order in which the method 200 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof. It will be understood that even though the method 200 is described with reference to the system 102, the description may be extended to other systems as well.

With reference to the description of FIG. 2, for the sake of brevity, the details of the components of the entity resolution system 102 are not discussed here. Such details can be understood as provided in the description provided with reference to FIG. 1.

The method 200 may provide an entity resolution from a plurality of documents. At block 202, a plurality of documents corresponding to a plurality of entities may be obtained from at least one data source. In one implementation, the plurality of documents may be textual documents. In one implementation, the blocking module 120 of the entity resolution system 102 may obtain the plurality of documents.

Following the obtaining of the plurality of textual documents, at block 204, the plurality of textual documents may be blocked into at least one bucket based on textual similarity and inter-document references. In one implementation, a graph traversal technique may be employed to block the plurality of textual documents based on inter-document references among the plurality of textual documents. In continuation to the blocking of the plurality of textual documents based on the document traversal technique, another blocking technique known as Locality Sensitive Hashing (LSH) may be adopted. In one implementation, the LSH technique may use hash functions for grouping or blocking the plurality of textual documents based on textual similarity among the plurality of textual documents. In one implementation, the plurality of textual documents may be hashed with bucket IDs. Therefore, the textual documents which are determined to be textually similar and are related based on the inter-document references can be grouped in the same bucket. In one implementation, the blocking module 120 of the entity resolution system 102 may block the plurality of textual documents into one or more buckets.

At block 206, within each bucket, a merged document for each entity may be created based on an iterative match-merge (IMM) technique. In one implementation, a pair-wise comparison of the textual documents in each bucket is performed to identify a set of textual documents relating to an entity. Further, two textual documents may be considered to be matching based on a match function, i.e., a pre-defined criteria. Therefore, based on the pre-defined criteria, within each bucket, a set of textual documents pertaining to each entity may be identified. In one implementation, the set of textual documents can be merged to create a merged document for each entity. Therefore, within each block, the textual documents are resolved to entities. The entities resolved from the textual document within a block are referred to as partial entities. In one implementation, the merging module 122 of the entity resolution system 102 may create a merged document for each entity.

Further, for the same entity, a merged document may be created in more than one bucket. In other words, as a result of the IMM technique, same entity can be resolved from multiple buckets. At block 208, a resolved entity-document for each entity may be generated by consolidating the merged documents from each bucket. In one implementation, a graph clustering technique may be employed to generate the resolved entity-document. Further, multiple partial entities emerging from the multiple buckets may be connected by the fact that same textual documents may be used in different buckets to resolve multiple partial entities.

In order to get a better understanding of the graph clustering technique, each textual document may be visualized as a node in a graph of textual documents. In case, two partial entities may share a textual document, i.e., a node, the nodes of the two partial entities may be connected through the common node. Therefore, all the textual documents corresponding to the nodes belonging to the two partial entities can be consolidated to form an entity-resolved document. In one implementation, the merging module 122 of the entity resolution system 102 may create the resolved-entity documents.

At block 210, the resolved-entity document collection may be updated upon receiving a new batch of textual documents. The new batch of textual documents may be processed using graph traversal technique, LSH technique, IMM technique, and graph clustering technique as mentioned above. In the present subject matter, rather than carrying out the ER analysis from scratch, the new set of textual documents may directly be analyzed with regard to the already resolved entities and the corresponding entity-resolved documents, thereby saving time taken for the analysis.

Although implementations of a method for resolving entities from a plurality of documents have been described in language specific to structural features and/or methods, it is to be understood that the present subject matter is not necessarily limited to the specific features or methods described.

We claim:

1. A method for resolving entities from a plurality of documents, the method comprising:

obtaining, by a processor, the plurality of documents corresponding to a plurality of entities, from at least one data source;

blocking, by the processor, the plurality of documents into one or more buckets based on textual similarity and inter-document references among the plurality of documents, wherein the inter-document references are indicative of relations in the plurality of documents, wherein the inter-document references are identified through corresponding referential attributes, wherein the referential attributes are selected from one of a hard referential attribute and a unique referential attribute of a referred document, wherein the hard referential attribute is an attribute for which two entries are considered to be matching only if the two entries are textually identical and the unique referential attribute is an attribute that has a unique entry for each entity in the plurality of documents, wherein the referential attributes are one of an implicit referential attribute and an explicit referential attribute, wherein the implicit referential attribute comprises a part of its value same as one of the hard referential attribute and the unique referential attribute of the referred document, wherein the explicit referential attribute is an exact value of one of the hard referential attribute and the unique referential attribute of the referred document, and wherein a Locality Sensitive Hashing (LSH) technique in combination with a document traversal technique is used to block the plurality of documents into the one or more buckets;

performing a pair-wise comparison of the plurality of documents in each bucket to identify a set of documents relating to an entity by using an iterative match-merge technique (IMM) based on a pre-defined criteria, wherein the iterative match-merge technique identifies, from the plurality of documents, at least one matching pair of documents and merges the at least one matching pair of documents to create at least one merged documents for each entity in the one or more buckets, wherein the at least one merged document for each entity from the one or more buckets is referred to as partial entities from the one or more buckets;

connecting the partial entities from the one or more buckets sharing the same document to generate a node-edge structure for each of the partial entities from the one or more buckets, wherein each partial entity has a number of associated documents, and each document is represented by a node in the node-edge structure, wherein all nodes belong to two partial entities sharing the same document are connected, and considered to be belonging to the same entity; and merging all the connected documents representing connected nodes from node-edge structures of the partial entities, belonging to the same entity, from the one or more buckets to form a resolved entity-document for each entity.

2. The method as claimed in claim 1 further comprising updating a resolved entity-document collection upon receiving a new set of documents, wherein an entity resolution analysis is continued without being restarted when the new set of documents are received, and the new set of documents are accommodated in the entity resolution analysis based on the entity resolution analysis already performed, wherein the updating is performed based on the textual similarity and the inter-document references among the new set of documents and the resolved entity-documents.

3. The method as claimed in claim 1, wherein the at least one matching pair of documents is identified based on the textual similarity and the inter-document references among the plurality of documents.

4. The method as claimed in claim 1, wherein the merged document for each entity is created using an R-Swoosh technique.

5. An entity resolution system for entity resolution from a plurality of documents, the entity resolution system comprising:

a processor;

a blocking module, coupled to the processor, to,
obtain the plurality of documents corresponding to a plurality of entities, from at least one data source; and
block the plurality of documents into one or more buckets based on textual similarity and inter-document references among the plurality of documents, wherein the inter-document references are indicative of relations in the plurality of documents, wherein the inter-document references are identified through corresponding referential attributes, wherein the referential attributes are selected from one of a hard referential attribute and a unique referential attribute of a referred document, wherein the hard referential attribute is an attribute for which two entries are considered to be matching only if the two entries are textually identical and the unique referential attribute is an attribute that has a unique entry for each entity in the plurality of documents, wherein the referential attributes are one of an implicit referential attribute and an explicit referential attribute, wherein the implicit referential attribute comprises a part of its value same as one of the hard referential attribute and the unique referential attribute of the referred document, wherein the explicit referential attribute is an exact value of one of the hard referential attribute and the unique referential attribute of the referred document, and wherein a Locality Sensitive Hashing (LSH) technique in combination with a document traversal technique is used to block the plurality of documents into the one or more buckets; and a merging module, coupled to the processor, to,
perform a pair-wise comparison of the plurality of documents in each bucket to identify a set of documents relating to an entity by using an iterative match-merge technique (IMM) based on a pre-defined criteria, wherein the iterative match-merge technique identifies, from the plurality of documents, at least one matching pair of documents and merges the at least one matching pair of documents to create at least one merged document for each entity in the one or more buckets, wherein the at least one merged document for each entity from the one or more buckets is referred to as partial entities from the one or more buckets;

connect the partial entities from the one or more buckets sharing the same document to generate a node-edge structure for each of the partial entities from the one or more buckets, wherein each partial entity has a number of associated documents, and each document is represented by a node in the node-edge structure, wherein all nodes belonging to two partial entities sharing the same document are connected, and considered to be belonging to the same entity; and merge all the connected documents representing connected nodes from node-edge structures of the partial entities, belonging to the same entity, to form a resolved entity-document for each entity.

6. The entity resolution system as claimed in claim 5 further comprising an updating module, coupled to the processor, to update a resolved entity-document collection upon receiving a new set of documents, wherein the resolution of entities is continued without being restarted when the new set of documents are received, and the new set of documents are accommodated in the resolution of entities based on the resolution of entities already performed, wherein the updating is performed based on the textual similarity and the inter-document references among the new set of documents and the resolved entity-documents.

7. The entity resolution system as claimed in claim 5, wherein the at least one matching pair of documents is identified based on the textual similarity and the inter-document references among the plurality of documents.

8. The entity resolution system as claimed in claim 5, wherein the merging module creates the merged document for each entity using an R-Swoosh technique.

9. A non-transitory computer-readable medium having embodied thereon a computer program for executing a method comprising:
   obtaining, by a processor, a plurality of documents corresponding to a plurality of entities, from at least one data source;
   blocking, by the processor, the plurality of documents into one or more buckets based on textual similarity and inter-document references among the plurality of documents, wherein the inter-document references are indicative of relations in the plurality of documents, wherein the inter-document references are identified through corresponding referential attributes, wherein the referential attributes are selected from one of a hard referential attribute and a unique referential attribute of a referred document, wherein the hard referential attribute is an attribute for which two entries are considered to be matching only if the two entries are textually identical and the unique referential attribute is an attribute that has a unique entry for each entity in the plurality of documents, wherein the referential attributes are one of an implicit referential attribute and an explicit referential attribute, wherein the implicit referential attribute comprises a part of its value same as one of the hard referential attribute and the unique referential attribute of the referred document, wherein the explicit referential attribute is an exact value of one of the hard referential attribute and the unique referential attribute of the referred document, and wherein a Locality Sensitive Hashing (LSH) technique in combination with a document traversal technique is used to block the plurality of documents into the one or more buckets;
   performing a pair-wise comparison of the plurality of documents in each bucket to identify a set of documents relating to an entity by using an iterative match-merge technique (IMM) based on a pre-defined criteria, wherein the iterative match-merge technique identifies, from the plurality of documents, at least one matching pair of documents and merges the at least one matching pair of documents to create at least one merged document for each entity in the one or more buckets, wherein the at least one merged document for each entity from the one or more buckets is referred to as partial entities from the one or more buckets;
   connecting the partial entities from the one or more buckets sharing the same document to generate a node-edge structure for each of the partial entities from the one or more buckets, wherein each partial entity has a number of associated documents, and each document is represented by a node in the node-edge structure, wherein all nodes belonging to two partial entities sharing the same document are connected, and considered to be belonging to the same entity; and
   merging all the connected documents representing connected nodes from node-edge structure of the partial entities, belonging to the same entity, from the one or more buckets to form a resolved entity-document for each entity.

10. The method of claim 1, wherein the referential attributes comprise soft attributes, wherein each soft attribute is an attribute for which two entries of the plurality of documents are considered to be matching, even if the two entries are not textually identical.

11. The system of claim 5, wherein the referential attributes comprise soft attributes, wherein each soft attribute is an attribute for which two entries of the plurality of documents are considered to be matching, even if the two entries are not textually identical.

12. The non-transitory computer-readable medium of claim 9, wherein the referential attributes comprise soft attributes, wherein each soft attribute is an attribute for which two entries of the plurality of documents are considered to be matching, even if the two entries are not textually identical.

* * * * *